No. 617,490. Patented Jan. 10, 1899.
C. LAWTON.
SALT CELLAR.
(Application filed Oct. 27, 1898.)

(No Model.)

WITNESS
John Buckler,
J. A. Stewart.

INVENTOR
Cecilia Lawton
BY
Edgar Tate & Co
ATTORNEYS

UNITED STATES PATENT OFFICE.

CECILIA LAWTON, OF CHARLESTON, SOUTH CAROLINA.

SALT-CELLAR.

SPECIFICATION forming part of Letters Patent No. 617,490, dated January 10, 1899.

Application filed October 27, 1898. Serial No. 694,654. (No model.)

*To all whom it may concern:*

Be it known that I, CECILIA LAWTON, a citizen of the United States, residing at Charleston, in the county of Charleston and State of South Carolina, have invented certain new and useful Improvements in Salt-Cellars, of which the following is a full and complete specification, such as will enable those skilled in the art to which it appertains to make and use the same.

This invention relates to salt-cellars; and the object thereof is to provide an improved device of this class in which the exit-openings will be always automatically closed when the device is in a normal or upright position, so as to exclude the air and moisture therefrom.

The invention is fully disclosed in the following specification, of which the accompanying drawings form a part, in which the separate parts of my improvement are designated by the same letters of reference in each of the views, and in which—

Figure 1:
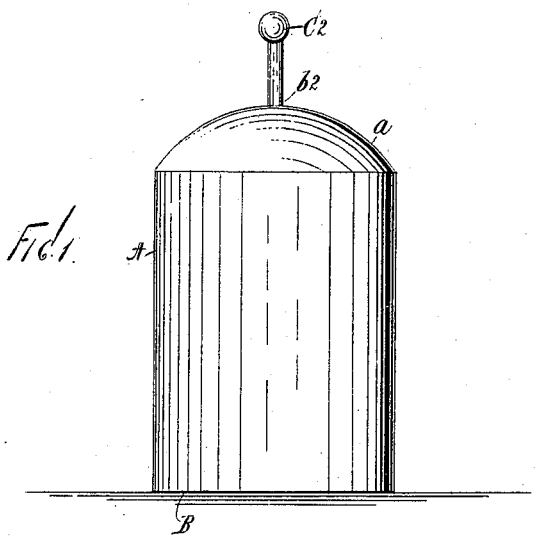
Figure 2:
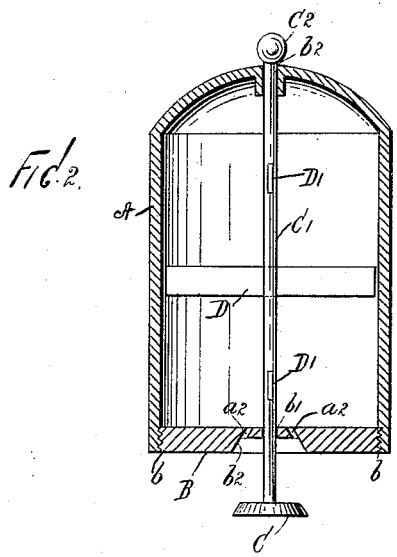

Figure 1 is a side elevation of a device embodying my improvement, and Fig. 2 a central vertical section.

In the practice of my invention I provide a receptacle A, which is preferably cylindrical in form, but which may be of any desired shape in cross-section and composed of any desired material. The receptacle A is preferably provided with a convex top $a$ and a flat detachable bottom B, which may be connected with the body portion of the receptacle by screw-threads $b$ or in any desired manner.

Passing vertically through the receptacle A is a rod C', which is loosely mounted in said receptacle and free to slide therein, and the bottom of the receptacle is provided centrally with an opening $b$, through which said rod passes, and the convex top thereof with a similar opening $b^2$, through which said rod also passes, and the upper end of said rod is provided with a knob or head $C^2$.

The lower end of the rod C' is provided with a disk or head C, the perimeter of which is beveled, as clearly shown in Fig. 2, and the detachable bottom B of the receptacle is provided centrally of the lower side thereof with a corresponding circular cavity or recess $b^2$, the perimeter of which is beveled to correspond with the disk or head C', and said disk or head is adapted to closely fit in said cavity or recess. The detachable bottom B is also provided with perforations $a^2$, which communicate with said cavity or recess and which are adapted to be closed by the disk or head C', and the perforations $a^2$ may be of any desired number and serve as exit-openings through which the contents of the receptacle may be sifted.

When the device is in an upright position or is set on a table or other support, the disk or head C fits in the cavity or recess $b^2$ and closes the perforations $a^2$ and prevents air from entering the receptacle and at the same time prevents the contents of the receptacle from escaping through said perforations, and when said receptacle is raised or lifted from the table or other support the rod C' drops downwardly, as shown in Fig. 2, and the contents may be sifted therefrom.

The rod C' is provided with transverse arms D and D', which are secured thereto or therein and which are of a length slightly less than the inner diameter of the receptacle, and these arms serve as breakers to break up and pulverize the contents of the receptacle and prevent the same from clogging in order that said contents may be sifted through the perforations $a^2$.

It will be understood that in shaking the receptacle in the operation of sifting the contents therefrom the rod C moves longitudinally therein and carries with it the arms D and D', and this operation of said parts is the same whenever the receptacle is shaken, and the contents of said receptacle are thus kept in proper form and prevented from clogging and becoming hard.

By excluding the air from the receptacle when the device is not in use I prevent moisture, with which the air is laden, from entering said receptacle, and thus aid in packing the contents thereof, it being understood that salt when subjected to air and moisture becomes soft and is easily packed.

My improved salt-cellar is simple in construction and operation and well adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A device of the character herein described, comprising a vessel or receptacle having a removable bottom, a cavity or recess formed centrally of said bottom, perforations formed in said bottom and communicating with said cavity or recess and a rod passed longitudinally and centrally through said vessel or receptacle and adapted to move longitudinally therein, said rod being provided at its lower end with a disk or head which is adapted to fit in and close said cavity or recess, substantially as shown and described.

2. A device of the character herein described, comprising a vessel or receptacle having a removable bottom, a cavity or recess formed centrally of said bottom, perforations formed in said bottom and communicating with said cavity or recess and a rod passed longitudinally and centrally through said vessel or receptacle and adapted to move longitudinally therein, said rod being provided at its lower end with a disk or head which is adapted to fit in and close said cavity or recess, and said rod being also provided within said vessel or receptacle with radial arms, substantially as shown and described.

3. A device of the character herein described, comprising a vessel or receptacle having a removable bottom, a cavity or recess formed centrally of said bottom, perforations formed in said bottom, and communicating with said cavity or recess, and a rod passing centrally through said bottom and through said cavity or recess, said rod being adapted to move longitudinally in said vessel or receptacle, and through said bottom, and being provided at its lower end with a disk or head which is adapted to fit in and close said cavity or recess, and also to close said perforations, and said rod being also provided within said vessel or receptacle with radial arms, substantially as shown and described.

In testimony that I claim the foregoing as my invention I have signed my name, in presence of the subscribing witnesses, this 20th day of October, 1898.

CECILIA LAWTON.

Witnesses:
JAMES F. SPINNEY,
CLUNY MCPHERSON MATHEWS.